United States Patent [19]
Griffiths

[11] Patent Number: 5,274,947
[45] Date of Patent: Jan. 4, 1994

[54] THREADABLE FISH HOOK BAIT RETAINER

[76] Inventor: Timothy Griffiths, 10975 W. 65th Ave., Arvada, Colo. 80004

[21] Appl. No.: 931,659

[22] Filed: Aug. 18, 1992

Related U.S. Application Data

[63] Continuation of Ser. No. 742,414, Aug. 8, 1991, abandoned.

[51] Int. Cl.⁵ ............................................. A01K 83/06
[52] U.S. Cl. .................................. 43/44.2; 43/44.4; 43/44.8
[58] Field of Search ............... 43/44.2, 44.4, 44.8, 43/42.36

[56] References Cited

U.S. PATENT DOCUMENTS

| 58,404 | 10/1866 | Goodwin | 43/44.8 |
|---|---|---|---|
| 615,170 | 11/1898 | Henckler | 43/44.4 |
| 2,115,493 | 4/1938 | Kosten | 43/44.8 |
| 2,482,721 | 9/1949 | Sigmundi | 43/44.2 |
| 2,513,548 | 7/1950 | Buss | 43/44.8 |
| 2,599,684 | 6/1952 | Bakken | 43/44.2 |
| 2,922,247 | 1/1960 | Buss | 43/44.8 |
| 5,025,586 | 6/1991 | Pixton | 43/42.36 |

FOREIGN PATENT DOCUMENTS

| 369346 | 11/1906 | France | 43/44.2 |
|---|---|---|---|
| 6810 | 4/1900 | United Kingdom | 43/44.2 |

Primary Examiner—Kurt C. Rowan
Attorney, Agent, or Firm—James E. Pittenger

[57] ABSTRACT

A novel bait retainer for fish hooks is disclosed which includes a wire type helix with at least one end of the retainer left open and having a sharp point. The body of the retainer is an elongated cylindrical configuration with a diameter and length which corresponds with the type of bait and size of hook with which the retainer is to be used. The retainer is positioned slidably over the shank of the hook with the open end positioned nearest the curved portion of the hook. In use the bait is inserted over the end of the hook and is moved to the shank portion. The retainer is rotatably threaded through the mass or body of the bait and the retainer and bait is then moved backward around the curved portion of the hook until the bait is properly positioned with respect to the barbed end of the hook. In this way the retainer supports the bait and holds the bait in the proper position to catch fish.

3 Claims, 1 Drawing Sheet

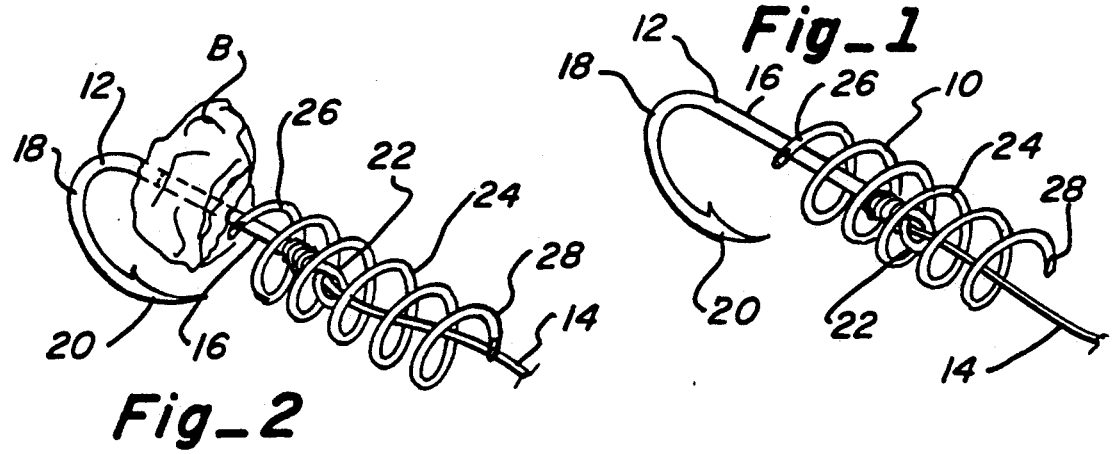
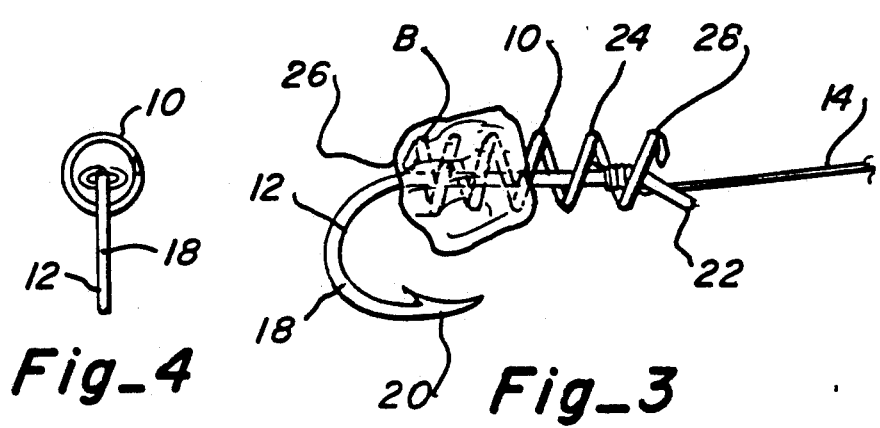
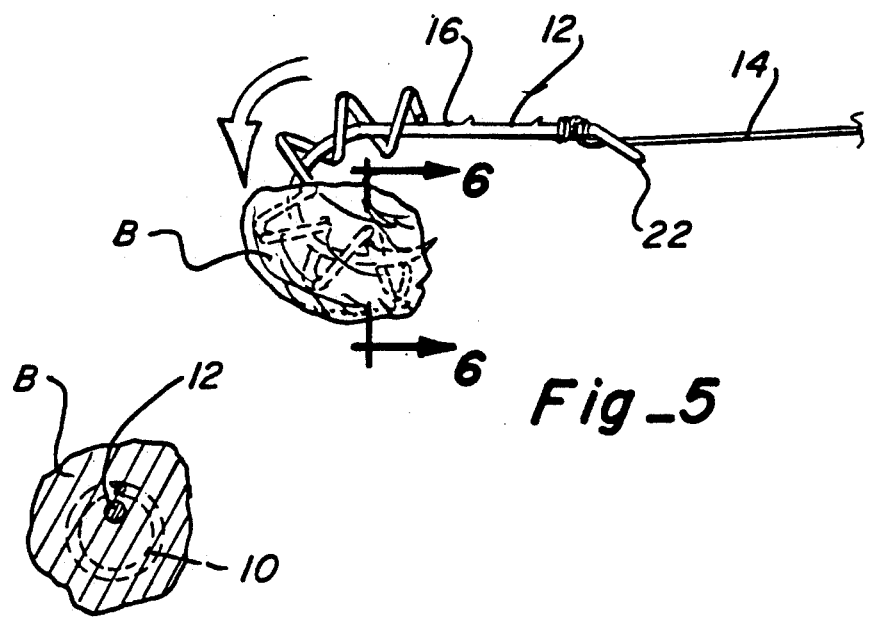

THREADABLE FISH HOOK BAIT RETAINER

This is a continuation of U.S. patent application Ser. No. 742,414, filed Aug. 8, 1991, which is now abandoned.

FIELD OF THE INVENTION

This invention is directed to a retainer for holding soft bait on a fish hook. It is more specifically directed to a threadable retainer which positions and holds the bait adjacent to the barbed end of the fish hook.

BACKGROUND OF THE INVENTION

Over the years there have been a number of attempts to add various types of retainers to fish hooks in order to improve the use of soft bait for fishing. Usually with the use of soft bait, such as dough balls and marshmallows, the bait is inserted over the barb of the hook and pushed back along the curved and/or shank portion of the hook. Without some kind of retainer the bait usually breaks apart and is lost even before the hook hits the water.

The same type of problem has occurred with live bait, such as worms, salmon eggs and crayfish tails. Although these types of bait do not disintegrate and fall apart as readily as other soft bait, it has been difficult to retain this type of bait on the fish hook for any length of time. In fact, in many cases the bait is lost without the fisherman knowing it and thus, the bare hook remains in the water without any success.

Most of the bait retainers, up to the present, have included some type of wire structure usually in helical form which is either crimped or permanently attached to the fish hook. In many cases the wire retainer is secured to the shank of the hook. The bait is then intertwined along the convolutes of the wire structure or the soft bait is mashed around the retainer to provide a gripping arrangement for holding the bait to the shank of the fish hook. All of these arrangements have proven to have deficiencies in that the bait is broken up or separated because it is pushed through or into the convolutes of the retainer. This mashing or squeezing procedure has a tendency to negate or detract from the intended purpose of the fish hook retainer. In addition, the bait is not properly positioned with respect to the barbed end of the hook.

The present invention is a substantial improvement over the existing retainers in that the bait is not mashed or squeezed into the retainer, but the retainer is easily positioned within the bait, with the bait in turn being properly supported and positioned over or near the barbed end for disguising the hook for successful fishing.

INFORMATION DISCLOSURE STATEMENT

This statement is provided to comply with the inventor's acknowledged duty to notify the Patent Office of any and all information to which the inventor is aware which has any direct bearing on the examination of this application.

The Goodwin patent (U.S. Pat. No. 58,404) discloses a spring covering the shank and curved portion of the hook. The spring is intended to push the bait and maintain it in a position adjacent to the barbed portion of the hook. There is no intent to thread the spring into the bait itself for the purpose of supporting and retaining the bait.

The Mattingly patent (U.S. Pat. No. 2,454,879) discloses a fish hook having a spiral spring threaded over the shank portion of the hook. The end of the spring closest to the curved portion of the hook is secured to the shank. The opposite end of the spring has a finger piece so that the spring can be expanded or extended. The coils of the spring are extended and the worm or bait is inserted between the coils and the coils are released to hold the bait. This may help to hold a worm on the shank of the hook but would not work with soft or pliable bait. The Anton et al patent describes a wire like bait retainer formed from easily pliable metallic wire. The ends of the wire are flattened and one end is crimped to the fish line immediately above the fish hook. The bait is threaded over the hook and onto the shank and the bait retainer wire is then wrapped around the bait in order to retain it. The Slehofer patent (U.S. Pat. No. 4,827,657) also shows a bait retainer positioned around the shank of the hook. This retainer is fabricated from a coiled sheet of plastic material which forms a spiral arrangement around the shank of the hook. The center portion of the spiral contacts the shank of the hook. The bait retainer in this way essentially grips the shank of the hook to prevent the retainer from rotating. The bait is pressed over the retainer and into the convolutes to form a holding function.

The Buss patent (U.S. Pat. No. 2,513,548), Laba patent (U.S. Pat. No. 3,034,250) and Kosten patent (U.S. Pat. No. 2,115,493) all show wire wrapped in a spring or coil fashion or bent into a circuitous pattern and attached securely to the shank or curved portion of the hook. The Buss patent discloses the use of a single or triple hook in conjunction with a spiral wire retainer which is permanently attached to the shank of the hook. The bait is pressed or wrapped around the retainer in order to hold it with respect to the hook.

The Sweetman patent (U.S. Pat. No. 2,531,995) and Leonardi patent (U.S. Pat. No. 2,808,678) disclose a helical spring positioned in conjunction with the shank of the fish hook. One end of the Sweetman spring is attached to the eye of the hook with the opposite end having an elongated end which is pivoted against the barb of the hook. This gate arrangement prevents the bait from being dislodged from the barb of the hook. The Leonardi patent discloses a double catch fish hook which has a helical spring threaded around the shank of a double hook. The eyelet of a hook is attached to the end portion of the spring. The spring does not contact the bait but provides a shock absorber and positioner for the hook.

The Kuntz patent (U.S. Pat. No. 3,396,485), Naffziger patent (U.S. Pat. No. 3,399,483) and McLoud patent (U.S. Pat. No. 3,905,149) show various miscellaneous types of bait retainers. The Kuntz patent shows a spring having two (2) elongated ends which are positioned with respect to the eye of the hook so as to retain the bait in close position to the shank of the hook. The Naffziger patent merely shows a conical shaped spring attached to the shank of a hook in conjunction with a sharply curved section provided in the shank. Bait is positioned on the sharply curved portion with the conically shaped spring used to bias and hold the bait in this position. The McLoud patent merely shows a barbed weight. The bait retainer is primarily intended for retaining a bait fish in position adjacent to the fish hook.

SUMMARY OF THE INVENTION

This invention is directed to a soft bait retainer for use in conjunction with a single hook. The bait retainer is a helically wound wire coil or spring having both ends of the coil in an extended or open position with the actual ends of the wire sharpened to a point. The helical spring or retainer is threaded over the barb of the hook and pushed upward to a position adjacent to and surrounding the shank of the fish hook and/or a portion of the line. When in use the soft bait is threaded over the barb of the hook and pushed up onto the mid- portion of the shank. The helical bait retainer is turned or rotated so as to thread the open end of the retainer substantially through the mass of the bait so that the retainer is secured within the bait itself. The bait and retainer is then pushed backward around the curved portion of the hook into a position wherein the bait is adjacent to or covering the barbed area of the hook. In this way, the retainer holds the bait in proper relation adjacent to or covering the barbed portion to properly position the bait for catching fish.

As will be explained later, the helical retainer can be formed from any desired material which provides the desired resilience as well as permeability. This is to say that the material must be compatible with either fresh water or salt water depending upon where the retainer is to be used. Although, in most cases the retainer will be formed from metal such as spring steel or stainless steel it can be made from suitable plastics. It is intended that the length and diameter of the helical retainer can be varied as desired to correspond with the size of fish hook as well as the type of bait which is intended to be used. Thus, even though it has been said that the diameter of the retainer can be slightly greater than the cross-section of the barb and the eyelet of the hook, it is also possible that the retainer can be somewhat larger to accommodate larger or softer bait such as; dough balls, salmon eggs, marshmallows, etc. When the soft bait is intended to be a worm or other live bait the retainer can have a smaller diameter to accommodate this type of bait. With both ends of the retainer left open it is immaterial which end of the retainer is fitted first onto the fish hook. It is desirable that the length of the retainer will be the same or greater than the length of the shank of the fish hook in order to have sufficient length to allow the fingers to grip the retainer and yet thread the retainer substantially into the body of the bait.

Other features of this invention will appear in the following description and appended claims, reference being made to the accompanying drawings which form a part of this application wherein like reference characters designate corresponding parts in the various views.

BRIEF DESCRIPTION OF THE DRAWINGS

FIG. 1 shows a perspective pictorial diagram of the helical wire retainer according to the present invention threaded over the shank and line portion of the fish hook;

FIG. 2 is a perspective diagram showing the soft bait pushed onto the shank portion of the fish hook;

FIG. 3 is a side view showing the helical wire retainer threaded substantially through the soft bait;

FIG. 4 shows an end view of the configuration shown in FIG. 1 which shows a sample of the approximate size of the retainer with respect to the hook;

FIG. 5 shows the bait and retainer pushed backwards so that the bait is positioned over the barbed area of the hook; and FIG. 6 is a cross-section taken along lines 6—6 of FIG. 5.

DETAILED DESCRIPTION OF THE INVENTION

Turning now more specifically to the drawings, FIG. 1 shows the bait retainer 10 according to the present invention mounted on a conventional fish hook 12 which is attached to a fish line 14.

The fish hook 12 includes a shank portion 16, curved portion 18, and barbed end 20. The opposite end of the fish hook 12 includes an eyelet or loop 22 to which the fish line 14 is knotted and attached. The eyelet 22 usually has an overall outside diameter which is about three or four times the actual diameter of the wire making up the shank 16 of the hook 12.

The novel bait retainer 10 according to the present invention is a section of helically wound wire having an elongated body section 24 and ends 26, 28. The ends 26, 28 are left open which is a continuation of the helix and the ends of the wire in turn are sharpened to a point. The internal diameter of the retainer and the overall length of the body section 24 is varied according to the size of the fish hook that is intended to be used. On the other hand, it is possible to vary the size of the retainer 10 in relation to the type of bait with which the retainer is to be used. As a result, the preferred embodiment of the invention is sized primarily as a compromise between the type of fish which is to be taken, and the bait which is to be used. These considerations in turn dictate the size of the hook and the overall length and diameter of the retainer that will be used.

In the preferred embodiment, the retainer 10 has a cylindrical configuration wherein the length of the body 24 is approximately 6-8 times the internal diameter of the retainer. The internal diameter of the retainer is sized to be at least 1½-3 times the diameter of the eyelet 22 of the hook 12 that is used. It has been found that a retainer (10) having an internal diameter which exceeds one-half of the thickness of the soft bait will provide adequate retention and support to the bait. The retainer itself can be fabricated from spring steel, bronze or brass spring wire, malleable metallic wire or any type of plastic or synthetic resin material which combines the rigidity and yet flexible characteristics which are required. Where before it has been expressed that both wire ends of the retainer are left open or extended out from the body of the retainer it is also possible that just one end is open with the opposite end closed or bent inwardly in contact with the adjacent coil of the retainer. This arrangement may be desirable since only one end will penetrate the bait while the opposite end forms a finger hold for rotating the retainer. While the retainer has been described as being cylindrical it is also possible that it could have a conical or involute configuration if desired. However, for the purpose of the preferred embodiment the cylindrical helix type wound coil arrangement is desirable.

To prepare the retainer for use it is only necessary to thread the retainer over the barbed end 20 of the attached hook 12 and force it around the curved portion 18 of the hook and in position adjacent the shank 16 and fish line 14. The retainer 10 is free to slidably move along this area but will not be dislodged from the hook because of the curved portion of the hook itself.

In use, as seen in FIG. 2, the barbed end 20 of the hook 12 is pushed so as to skewer the middle portion of the bait B with the bait forced backwardly around the curved portion 18 and onto the straight portion of the shank 16. The open end 26 of the retainer 10 is then positioned adjacent to the bait B and the retainer body 24 is rotated in a counter clockwise direction as indicated by arrow A as shown in FIG. 3. This rotation and the fact that the open end 26 is sharpened or pointed allows the retainer to thread into and penetrate the mass of the bait B. The rotation of the retainer 10 is continued until the end 26 of the retainer starts to protrude from the opposite side of the bait. In this way a portion of the length of the retainer is embedded in the bait which helps to stabilize and support the bait as a one-piece mass. At the same time, a portion of the retainer remains outside of the bait and positioned along the shank of the hook. This remaining portion acts as a finger hold or grip for positioning and rotating the retainer during use. It is naturally understood that the direction of the threading of the retainer into the bait is performed in the direction which corresponds to the pitch of the coils of the retainer.

Once the retainer has been embedded in the bait as shown in FIG. 3 the retainer and bait is then pushed backward around the curved portion 18 of the hook 12 until the bait is positioned substantially over or near the barbed end 20 of the hook. The bending of the retainer around the curved portion 18 of the hook 12 tends to bind the coils of the retainer against the curved portion of the hook which causes it to hold its position with respect to the end of the hook. This in turn causes the bait to be securely held in proper position with relation to the barbed end of the hook. The overall length of the retainer is intended to be sufficient so that when the retainer is in use one end of the retainer will be over the barbed end of the hook while at the same time the opposite end is positioned over at least a part of the straight shank portion of the hook as shown in FIG. 5. In this position the body of the retainer produces the binding and holding effect which is so important to the present invention.

The retainer 10 will in no way interfere with the engagement of the fish with the hook and will allow the fish to be impaled by the barbed portion. The retainer once the fish has been landed, can be slid back over the shank of the hook and reused as desired.

Although a number of the prior art retainers have used retainers having a plurality of coils similar to the present configuration, all of these arrangements have attached the retainer rigidly to the hook which prevents it from turning. Two novel features of the present retainer provide the unique function which is available in the present invention. The first unique feature is the fact that the retainer in the present invention is threaded or turned through the mass of the bait to substantially penetrate the bait. This provides rigidity and actual support to the mass of the bait to retain it as a single lump or object. This rigidity and support is best obtained when the internal diameter of the retainer exceeds one-half of the thickness of the bait mass. The second critical feature is the fact that the retainer allows the bait to be repositioned back over the barbed end of the hook and the bending of the body of the retainer around the curved portion of the hook holds the retainer and bait in the correct position with respect to the end of the hook. These two features make this invention patentably distinct over any of the prior art that is known.

While a novel bait retainer for fish hooks has been shown and described in detail in this application, it is understood that this invention is not to be limited to the exact form disclosed and changes in the detail and construction of the retainer may be made without departing from the spirit thereof.

What is claimed is:

1. A method for holding and retaining a soft bait mass on a fish hook, said fish hook being of the conventional type having a barbed end, curved hook portion and substantially straight shank portion, the method comprising:
   a) sliding a helical wire wound, elongated retainer over the barbed end of the fish hook and around the curved portion of the hook, the retainer having a body portion and opposite ends, said helical retainer being sized so that its diameter exceeds one-half of the overall thickness of a bait mass;
   b) positioning said retainer to surround the straight shank portion of the fish hook, one end of the helical retainer nearest the barbed end of said hook being open and pointed;
   c) sliding a mass of soft bait over the barbed end of the hook and positioning it on the straight shank portion of the hook;
   d) rotating the retainer to thread the open end of the retainer substantially through the bait mass; and
   e) sliding the bait mass and retainer around the curved portion of the hook to a position with the bait mass positioned over the barbed end of the fish hook and one end of the retainer is over the barbed end of the hook and the opposite end is positioned over at least a part of the straight shank portion of the hook so that the retainer is lodged in the curved portion of the hook to firmly hold the retainer and bait in proper position.

2. A bait retainer for holding and supporting a soft bait mass on a conventional fish hook, said fish hook having a barbed end, a curved portion, a relatively straight shank portion and an eyelet to attach the hook to a fishing line, the belt retainer comprising;
   a) a wire wound elongated helical body portion having opposite wire ends, said body portion having an internal diameter sufficient to freely pass over the barbed end and eyelet of the fish hook and said internal diameter exceeds one-half of the thickness of the soft bait mass, the wire used to form said body portion being resilient so that said body portion can bend to conform to the curved portion of the hook;
   b) one of the wire ends of said body portion being arranged in an open configuration, said open end of said body portion being positioned nearest the barbed end of the fish hook;
   c) said body portion having a length which allows one end of the retainer to be positioned over the barbed end of the hook and the opposite end positioned over at least a part of the straight shank portion of the hook whereby the retainer body can be threadedly rotated to substantially penetrate the mass of a soft bait and also having sufficient length to be gripped by the fingers of he user; and
   d) whereby the retainer can be slideably positioned over the straight shank portion of the fish hook and the user can slide a mass of soft bait over the barbed end of the hook and position it on the straight shank portion of the hook so that by rotating the retainer the open end of the retainer can be threadedly inserted substantially through the bait mass and the bait mass and retainer can be pushed back around the curved portion of the hook to a position where the bait mass and one end of the retainer are positioned over the barbed end of the hook and the opposite end of the retainer is positioned over at least a part of the straight shank portion of the hook so that the retainer is lodged in the curved portion of the hook to firmly hold the retainer and bait in the proper position.

3. A bait retainer as defined in claim 2 wherein said wire wound retainer is formed from thin, resilient plastic wire like material.

* * * * *